Patented Sept. 7, 1948

2,448,818

UNITED STATES PATENT OFFICE 2,448,818

PROCESS OF ISOLATING LOW-METHOXYL PECTINIC ACIDS

Rolland M. McCready, Harry S. Owens, and William D. Maclay, Berkeley, Calif., assignors to the United States of America as represented by the Secretary of Agriculture No Drawing. Application September 14, 1945, Serial No. 616,445

10 Claims. (Cl. 260—209.5)

(Granted under the act of March 3, 1883, as amended April 30, 1928; 370 O. G. 757)

1

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to low-methoxyl pectinic acids and has among its objects the provision of a simple and economical process of isolating such pectinic acids in a solid, substantially dry form. Other objects will be apparent from the following description of the invention.

As used herein, "pectin" is defined as the familiar preparation of commerce or the laboratory, prepared from plant extracts by precipitation with alcohol, acetone, or metallic salts, with no attempt to modify its natural methoxyl content. By "pectic acid" is meant a more or less completely demethoxylated pectin, and by "pectinic acid" is meant any one of a series of derivatives of pectin with methoxyl content intermediate between that of pectin and pectic acid. In the present application, the term "pectinic acid" is used generically to indicate either the acid itself or its salts.

The methods used to isolate pectinic acids of low-methoxyl content are those commonly used in the preparation of high-methoxyl pectinic acids (pectins). These methods include isolation by vacuum concentration of the pectin extraction liquor followed by precipitation with an organic solvent such as ethyl or isopropyl alcohol, or by spray or drum-drying; or by precipitation of the pectin from the unconcentrated extraction liquor with a soluble aluminum salt at a pH of about 4, followed by removal of the aluminum from the formed pectin-aluminum complex with acidified aqueous alcohol; or precipitation of the pectin with a metallic ion such as calcium, copper, or nickel, followed by removal of the metal by either washing with acidified aqueous alcohol or by means of an ion exchange material.

Each of the above described methods of isolation embody the use of either vacuum concentration or large volumes of organic solvents, or both, to yield a water-soluble pectin in a solid state suitable for drying. Vacuum concentration of large volumes of water and precipitation of the pectin by means of organic solvents are costly processes. By means of the process of this invention, however, low-methoxyl pectinic acids can be isolated in good yield without resort to these expensive methods.

2

According to the invention, aqueous solutions or extraction liquors of low-methoxyl pectinic acids, which have been prepared by acidic, alkaline, or enzymic deesterification from source materials such as citrus peel, apple pomace, and so forth, in a known manner, are treated with a mineral acid such as sulfuric, hydrochloric, nitric, phosphoric, and sulfurous acid, the pH of the resulting acidified solution not exceeding about 2.3, preferably not exceeding 2.0, thereby causing the precipitation of the pectinic acid in the free-acid form and in a physical state suitable for subsequent processing. The precipitated product is then separated from the acidified solution, and the excess acid is then removed from the precipitate by washing it with water until the pH of the acid-water wash reaches a maximum pH of about 2.3, preferably between about 2.0 and 2.3, and more preferably a pH about 2.2. The excess moisture from the precipitated and washed product is then removed by drying with appropriate means, such as by vacuum or atmospheric driers. Solutions of the products may also be spray- or drum-dried.

Acid precipitation may also be used as an inexpensive method of concentration of low-methoxyl pectinic acids, as the ammonium salt (ammonium acid pectinate), for example, by precipitation of the pectinic acid from dilute solutions such as an 0.8 percent solution, straining and pressing the formed precipitate, and then forming an aqueous solution of the pectinic acid by adjusting the pH to exceed about 4 by treatment of the precipitate with a basic material such as ammonia, ammonium hydroxide, or alkali metal carbonates, bicarbonates, or hydroxides. Thereafter, the pectinic acid may be isolated as described above, or the concentrated pectinic acid solution may be used as such. The following examples are illustrative of the invention:

Example I

Five hundred milliliters of 1.0 percent low-methoxyl pectinic acid (commercial low-methoxyl apple pectin prepared by acidic deesterification, methoxyl content of 5.1 percent) solution was poured into 100 milliliters of a solution containing 10 milliliters of concentrated sulfuric acid, causing precipitation of the pectinic acid. The resulting pH of the acidified solution was about 1.5. The pectinic acid was strained from the acidic solution and washed three times with water until the pH of the precipitated low-methoxyl pectinic acid-water mixture was about 2.3. The pectinic acid was strained from the washed solution, pressed, and dried in vacuo for about 12 hours. A recovery of 97 percent of the low-methoxyl pectinic acid was obtained.

Example II

Thirty liters of 5 percent low-methoxyl pectinic acid (prepared from pectin deesterified with ammonium hydroxide to a methoxyl content of 3.7 percent or an equivalent weight of 258) solution was poured into 20 liters of sulfuric acid solution containing 800 milliliters of concentrated acid, causing precipitation of the pectinic acid. The resulting pH of the acidified solution was about 1.5. The precipitated pectinic acid was strained from the acidic solution and washed three times by suspending in 30 liters of water followed by draining. The pH of the third pectinic acid-wash water mixture was about 2.2. The washed low-methoxyl pectinic acid was strained, pressed, shredded, and divided into two parts. One part was dried in vacuo at about 150° F. for about 20 hours, and the other portion was dried in an atmospheric tray drier at about 185° F. for about three hours. Both methods of drying yielded white products of desirable physical texture which were then ground to 150 mesh in a hammer mill.

Example III

Three liters of 0.3 percent low-methoxyl pectinic acid (prepared from pectin deesterified with ammonium hydroxide to a methoxyl content of 3.0 percent) solution was poured into 100 milliliters of sulfuric acid solution while stirring, causing precipitation of the pectinic acid. The resulting pH of the acidified solution was about 1.3. After standing for about 20 minutes, the pectinic acid was strained from the acidic solution with cheesecloth, washed three times with 400 milliliters of water each time, the pH of the final low-methoxyl pectinic acid-wash water mixture being about 2.1. The washed pectinic acid was strained, pressed, and dried at about 140° F. in vacuo for about 20 hours, yielding about 9 grams of product.

Example IV

To 5 liters of 1 percent low-methoxyl pectinic acid (prepared from pectin alkaline-deesterified to a methoxyl content of 4.1 percent) solution was added a sulfuric acid solution, causing precipitation of the pectinic acid. The resulting pH of the acidified solution was about 2.0. The precipitated pectinic acid was strained, washed with water until the pH of the low-methoxyl pectinic acid-wash water mixture was about 2.2, and then dried in vacuo at about 140° F. for about 18 hours.

Example V

To 3,000 milliliters of 0.82 percent low-methoxyl pectinic acid (prepared from pectin deesterified by citrus pectinesterase in situ to a methoxyl content of 6.0 percent) solution was added dilute sulfuric acid until the final pH of the resulting acidified solution was about 2.0, thus precipitating the pectinic acid. The precipitated pectinic acid was pressed, washed with water to remove excess acid, again pressed, and dried at about 158° F. in vacuo for about 18 hours. A yield of 22 grams was obtained, representing a recovery of 85 percent of the pectinic acid.

Example VI

Three liters of 0.82 percent low-methoxyl pectinic acid (prepared from pectin deesterified by citrus pectinesterase in situ to a methoxyl content of 4.2 percent) solution was added to a dilute sulfuric acid solution, causing the precipitation of the pectinic acid. The resulting pH of the acidified solution was about 2.0. The precipitated pectinic acid was strained from the acidic solution, pressed, washed with water to remove excess acid, pressed, and dried in vacuo at about 158° F. for about 18 hours. A yield of 23 grams was obtained, representing a recovery of 89 percent of the pectinic acid.

Example VII

To a solution of low-methoxyl pectinic acid (prepared by alkaline deesterification of an orange-peel pectin extract) was added a sulfuric acid solution, causing precipitation of the pectinic acid. The pH of the resulting acidified solution was about 1.2. The precipitated pectinic acid was strained, washed by resuspension in water, strained again, and dissolved by the addition of ammonium hydroxide solution until the resulting solution had a pH exceeding about 4. Three hundred milliliters of the concentrated solution (containing about 3 percent pectinic acid) was then dried in vacuo at about 140° F. to form a thin sheet of low-methoxyl pectinic acid.

The solubility of pectinic acids decreases with the lowering of the pH. Washing of the precipitated low-methoxyl pectinic acid can be carried out at a maximum pH of about 2.3 without causing appreciable solution of the pectinic acid.

Aqueous washing of acid-precipitated low-methoxyl pectinic acids to a pH of about 2.2 for the pectinic acid-aqueous washing mixtures removes the excess of acid to a degree which, when the precipitated pectinic acid is pressed to a moisture content of about from 70 to 80 percent, will permit drying of the pectinic acid to a moisture content of about from 5 to 10 percent without charring.

The pH of the acidified solution can vary somewhat, depending upon the methoxyl content and molecular weight of the pectinic acid; but in general, solution pHs of about 2.3, and preferably about 2 or less, are essential in this process.

Pectinic acids of methoxyl content as high as 6.0, 5.1, and 4.1 percent, which have been prepared by enzymic, acidic, and alkaline deesterification, respectively, have been isolated in high yields by the process of this invention, yields of about 90 percent having been regularly obtained.

Pectinic acids of various intrinsic viscosities (measure of molecular chain length) have been satisfactorily isolated by the technique herein described; however, the higher the methoxyl the higher the viscosity must be to obtain a suitable precipitate. An intrinsic viscosity of about 3 is satisfactory in the methoxyl range of 0 to 3, of about 4 in the range from 3 to 5. To obtain precipitates with pectinic acids which have higher methoxyl contents, a pectinesterase must be used for the deesterification.

Concentrations of low-methoxyl pectinic acid solutions as low as about 0.3 percent can be isolated in good yields by the process of our invention.

Having thus described our invention, we claim:

1. A process comprising adjusting an aqueous solution of a low-methoxyl pectinic acid to a pH not exceeding about 2 with a mineral acid thereby to precipitate the low-methoxyl pectinic acid, and separating the low-methoxyl pectinic acid from the acidified solution.

2. The process of claim 1 wherein the mineral acid is sulfuric acid.

3. A process comprising adjusting an aqueous solution of a low-methoxyl pectinic acid to a pH of about 1.5 with a mineral acid thereby to precipitate the low-methoxyl pectinic acid, and separating the low-methoxyl pectinic acid from the acidified solution.

4. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, and washing the low-methoxyl pectinic acid with water until the pH of the pectinic acid-wash water mixture does not exceed about 2.3.

5. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, and washing the low-methoxyl pectinic acid with water until the pH of the pectinic acid-wash water mixture is between about 2.0 and 2.3.

6. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, and washing the low-methoxyl pectinic acid with water until the pH of the pectinic acid-wash water mixture is about 2.2.

7. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, washing the low-methoxyl pectinic acid with water until the pH of the pectinic acid-wash water mixture is between about 2.0 and 2.3, and then drying the low-methoxyl pectinic acid.

8. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, washing the low-methoxyl pectinic acid with water until the pH of the pectinic acid-wash water mixture is between about 2.0 and 2.3, reducing the moisture content of the washed low-methoxyl pectinic acid to about from 70 to 80 percent, and then drying the low-methoxyl pectinic acid to a moisture content of about from 5 to 10 percent.

9. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, and forming an aqueous solution of the low-methoxyl pectinic acid at a pH exceeding about 4.

10. A process comprising adjusting an aqueous solution of a low-methoxyl pectinic acid to a pH not exceeding about 2 with a mineral acid thereby to precipitate the low-methoxyl pectinic acid, separating the low-methoxyl pectinic acid from the acidified solution, forming an aqueous solution of the low-methoxyl pectinic acid at a pH exceeding about 4, and drying the resulting solution.

ROLLAND M. McCREADY.
HARRY S. OWENS.
WILLIAM D. MACLAY.

REFERENCES CITED

The following references are of record in the file of this patent:

UNITED STATES PATENTS

| Number | Name | Date |
|---|---|---|
| 1,410,920 | Huber | Mar. 28, 1922 |

FOREIGN PATENTS

| Number | Country | Date |
|---|---|---|
| 539,620 | Great Britain | Sept. 18, 1941 |
| 541,528 | Great Britain | Dec. 1, 1941 |

OTHER REFERENCES

"Fruit Pectins," C. L. Hinton, Dept. of Scientific and Industrial Research Food Investigation, Special Report No. 48, London, 1939 (pages 72–73).